United States Patent [19]

Marengo

[11] Patent Number: 4,995,538
[45] Date of Patent: Feb. 26, 1991

[54] MOTOR VEHICLE ROOF RACK

[75] Inventor: Osvaldo Marengo, Turin, Italy

[73] Assignee: FAPA S.p.A., Turin, Italy

[21] Appl. No.: 279,631

[22] Filed: Dec. 5, 1988

[30] Foreign Application Priority Data

Dec. 4, 1987 [IT] Italy .................. 53864 B/87

[51] Int. Cl.⁵ .............................. B60R 9/00
[52] U.S. Cl. .................. 224/329; 224/315; 224/321; 224/325
[58] Field of Search ............. 224/315, 321, 325, 322, 224/329, 330, 331

[56] References Cited

U.S. PATENT DOCUMENTS

| 2,596,860 | 5/1952 | McCrory et al. | 224/325 |
| 2,888,178 | 5/1959 | Olson | 224/329 |
| 3,229,115 | 3/1966 | Bott et al. | 224/319 |
| 3,495,750 | 2/1970 | Oliveira | 224/329 X |
| 3,836,058 | 9/1974 | Penniman et al. | 224/42.01 |
| 4,214,687 | 7/1980 | Covell | 224/323 |
| 4,354,625 | 10/1982 | Peoples | 224/329 |
| 4,586,638 | 5/1986 | Prescott et al. | 224/329 |
| 4,705,198 | 11/1987 | Kamaya | 224/329 |
| 4,809,943 | 3/1989 | Taschero | 224/329 X |

FOREIGN PATENT DOCUMENTS

| 0273480 | 7/1988 | European Pat. Off. | 224/330 |
| 3313267 | 10/1984 | Fed. Rep. of Germany | 224/321 |
| 3605479 | 9/1986 | Fed. Rep. of Germany |  |
| 1147612 | 11/1957 | France |  |
| 2583357 | 12/1986 | France |  |
| 60-56649 | 2/1985 | Japan |  |
| 789793 | 8/1935 | Switzerland | 224/329 |
| 2179901 | 3/1987 | United Kingdom |  |

Primary Examiner—Ernest G. Cusick
Attorney, Agent, or Firm—Sughrue, Mion, Zinn, Macpeak & Seas

[57] ABSTRACT

A rack for a motor-vehicle roof comprises a pair of bridges (10) each having a cross member (12), a pair of box-shaped feet (14) for bearing on the roof (T) and a connector for hooking and fixing each foot on to the edge (B) of the roof, such as the drainage channel or the upper edge of a door opening. Each cross member (12) is slidably inserted in respective transverse passages formed in the upper parts of the feet (14) and pressure members are associated with each transverse passage, respectively, for clamping the cross member (12) in an adjusted position. The hooking and fixing connector for each bridge (10) is comprised of an inextensible strap (18) which passes through each foot (14), through an opening in an outer wall of the foot and which is provided, outside this outer wall, with a rigid, shaped hook (20), which is replaceable by other similar hooks of different shapes, for hooking on the edge (B) of the roof (T). At least one of the two feet (14) incorporates a device for tensioning the strap (18).

7 Claims, 4 Drawing Sheets

MOTOR VEHICLE ROOF RACK

BACKGROUND OF THE INVENTION

The present invention relates to a rack for motor vehicle roofs, of the type comprising a pair of bridges, each having a cross member, a pair of box-shaped feet for bearing on the roof and means for hooking and fixing each foot on to the edge of the roof, such as the drainage channel or the upper edge of a door opening, each cross member being slidably inserted in respective transverse passages formed in the upper parts of the feet, and pressure means being associated with each transverse passage for clamping the cross member in an adjusted position.

Throughout the present description and in the claims, the terms "longitudinal", "transverse" and their equivalents relate to the direction of travel of the vehicle; the terms "inner" and "outer" and their equivalents indicate sides or parts facing or situated inwardly or outwardly of the roof of the vehicle respectively; by "rack" is meant an article as defined, which can carry various accessories so as to constitute, for example, a ski-rack, a rod-shack, a surfboard rack, a boat-rack and the like.

SUMMARY OF THE INVENTION

The object of the present invention is to provide a rack of the type defined which has universal characteristics, that is to say, which can be adapted to any type of motor-vehicle roof, regardless of the shape, width and length of the roof.

According to the present invention, this object is achieved by means of a rack as defined, characterised essentially in that the hooking and fixing means of each bridge comprise an inextensible strap which passes through each foot, through an opening in an outer wall of the foot, and which is provided outside this wall with a rigid, shaped hook which is replaceable by similar but differently shaped hooks, for hooking on to said edge of the roof and in that at least one of the two feet incorporates means for tensioning the strap.

BRIEF DESCRIPTION OF THE DRAWINGS

Further characteristics and advantages of the invention will become clear from a reading of the detailed description which follows with reference to the appended drawings, given by way of non-liniting example, in which.

DETAILED DESCRIPTION OF THE INVENTION

Figure 1:
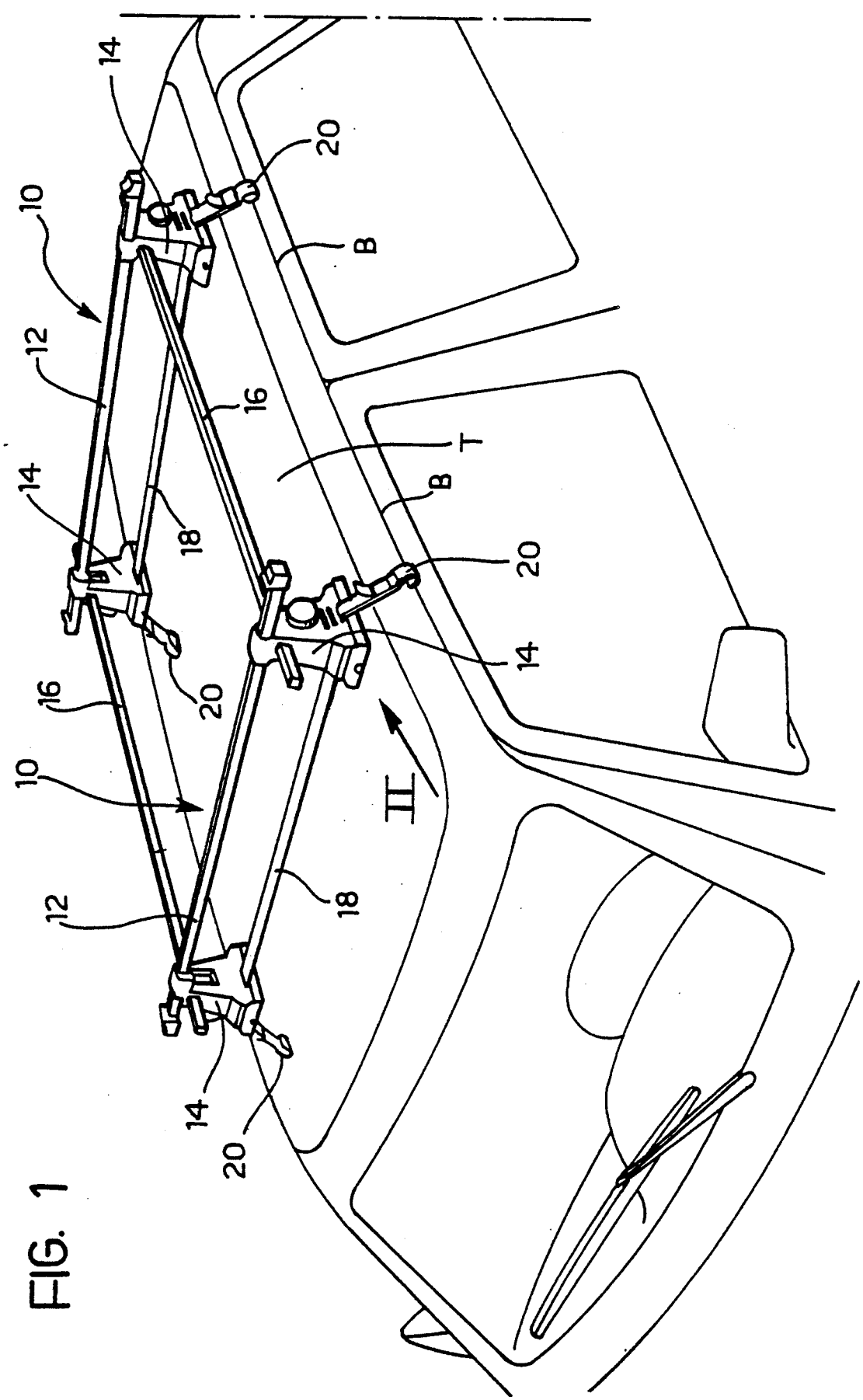
FIG. 1 is a perspective view of a rack according to the invention mounted on the roof of a motorcar.

With reference to FIG. 1, a rack according to the invention is mounted on the roof T of a motorcar. The rack includes a pair of bridges 10, each of which in turn includes a cross member 12, constituted, in known manner, by a metal box profile of rectangular section. Each bridge 10 further includes a pair of box-shaped feet 14 to which the cross members 12 are fixed. The structure of the feet 14 will be described below.

The homologous feet 14 on each side preferably also support, as shown, respective side members 16 which interconnect them for the purpose which will be explained below.

Each bridge 10 is provided with a strap 18 of inextensible material, for example a textile. The strap 18 passes through each foot 14 of the respective bridge 10 and is provided at its two ends, with rigid shaped hooks 20, each constituted, for example, by a strip of bent sheet metal. In the drawings, a hook 20 is shown, which is shaped so as to hool on to the upper edge B of a door opening, in the case of a roof without drainage channels. It is, however, envisaged, that a rack according to the invention would be equipped with similar replaceable hooks of various shaped so as to be able to be hooked onto the edges of roofs of different shapes, and amongst others, those with drainage channels.

At least one of the feet 14 of each bridge 10, and preferably both feet 14, incorporated means for tensioning the strap 18 in order to keep the hooks 20 hooked firmly onto the edges B and the feet 14 applied firmly to the roof T.

As will be better described below, the positions of the cross members 12 relative to their feet 14 are adjustable to enable the spacing of the feet to be adjusted once can for all in dependence on the width of the roof T.

The side members 15 are also adjustable relative to the feet 14 to enable the positions of the homlogous feet 14 to be adjusted once and for all in dependence on the length of the roof T. The side members 16 also have the function of stiffening the rack.

The system for adjusting and clamping the cross members 12 and the side members 16 relative to the feet 14 will be described further below.

Figure 2:
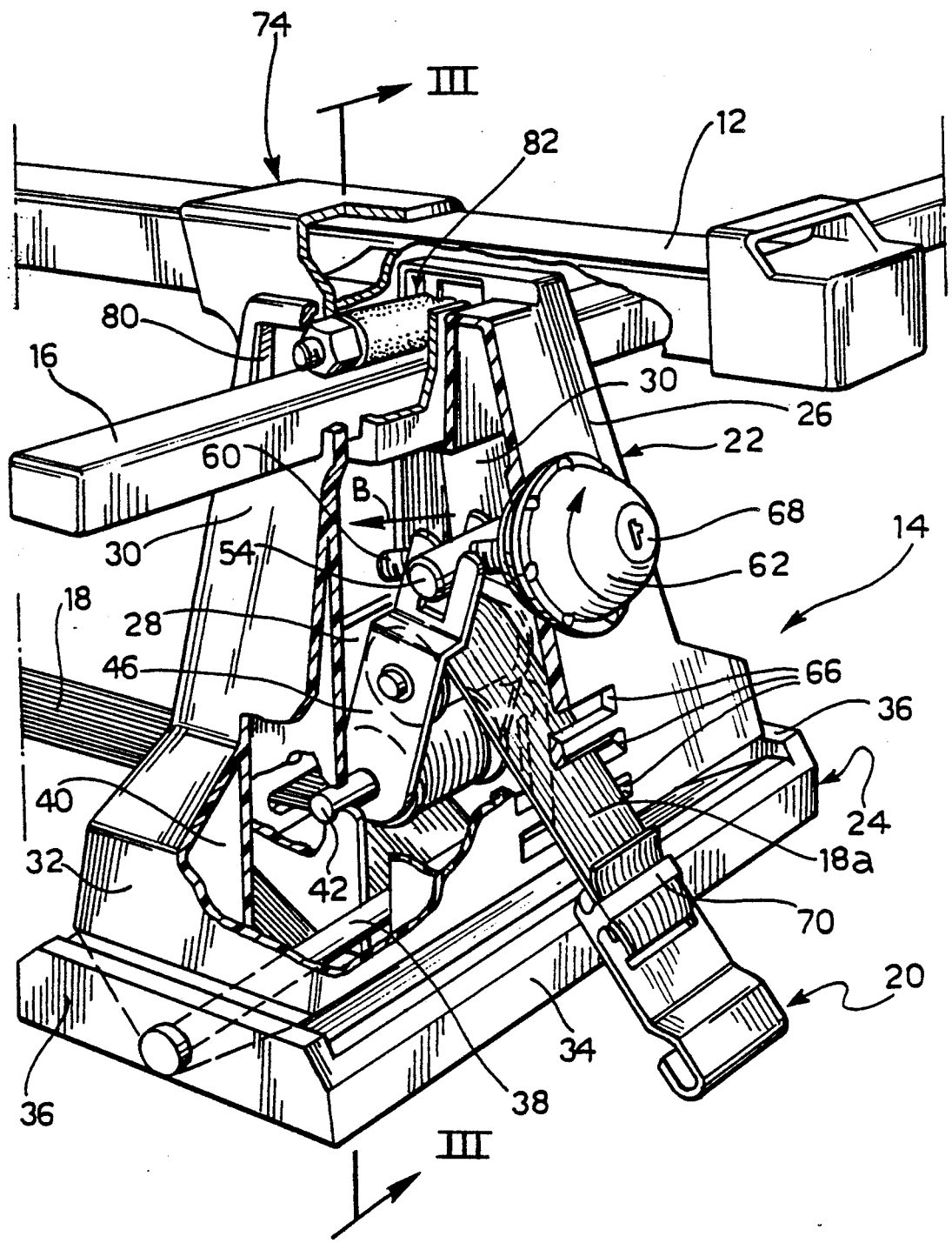
FIG. 2 is a cut-away perspective view of a part corresponding to one of the feet of the rack, on an enlarged scale.
Figure 3:
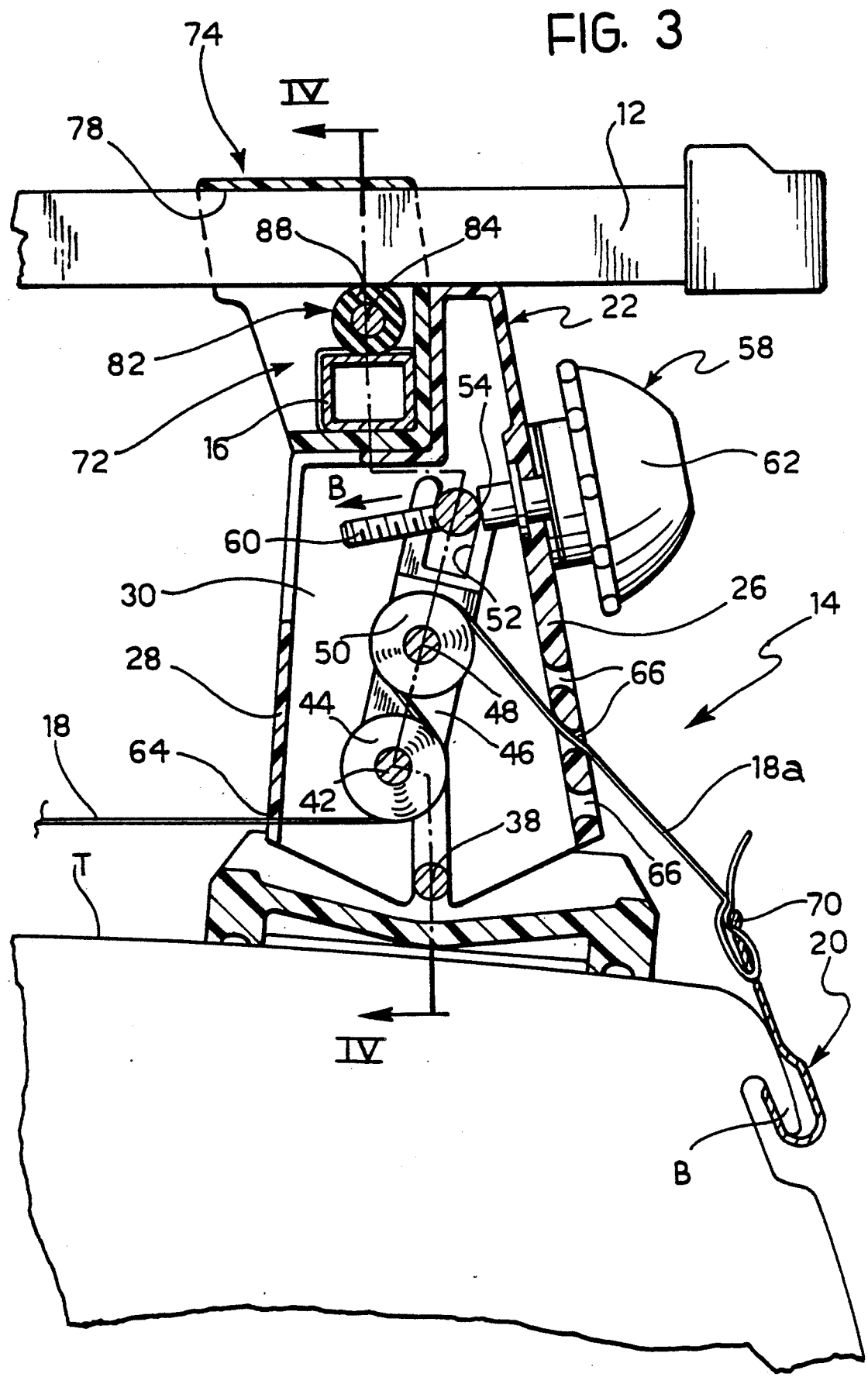
FIG. 3 is a cross-section taken on the plane III—III of FIG. 2.
Figure 4:
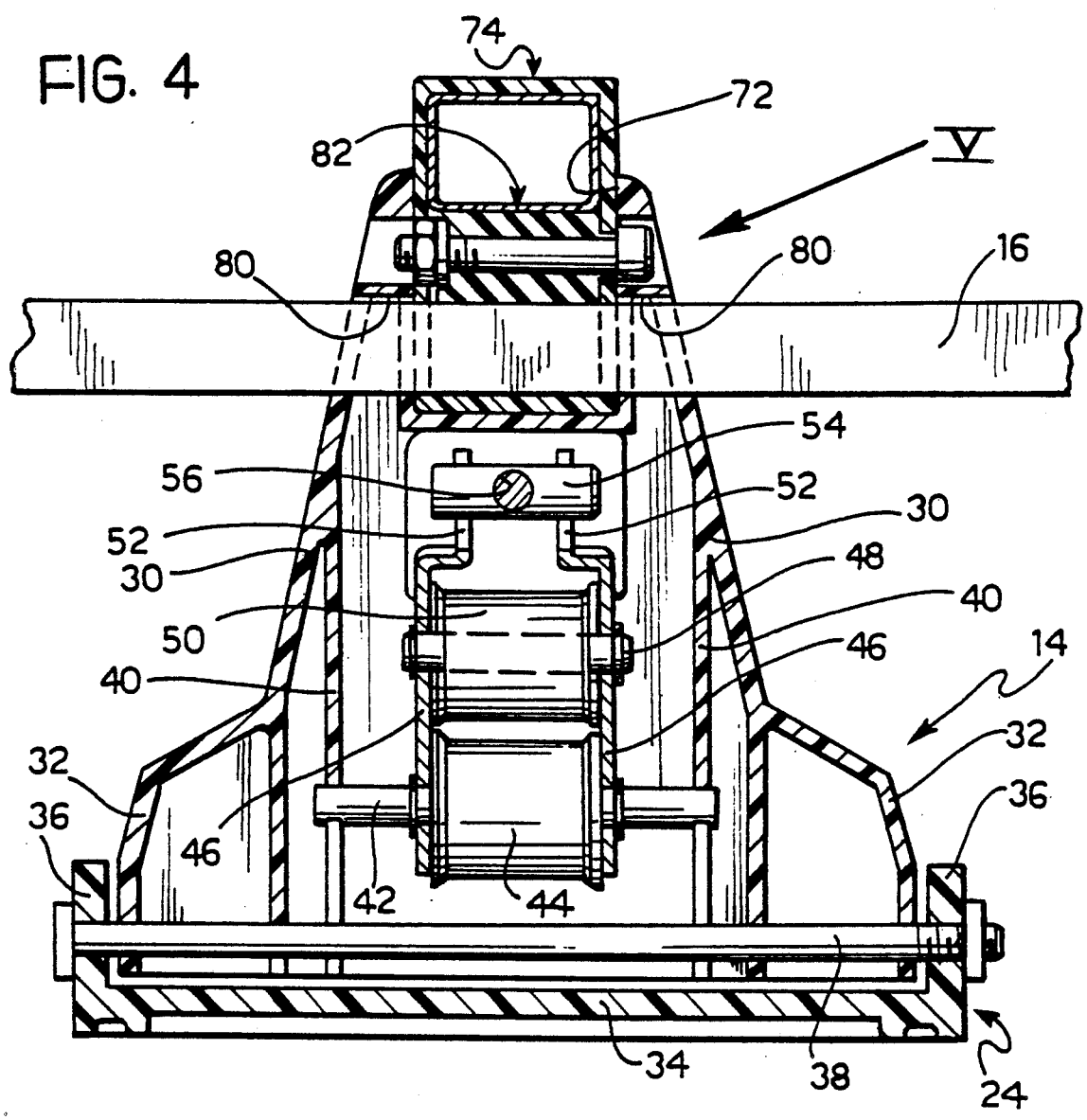
FIG. 4 is a longitudinal section taken on the plane indicated IV—IV in FIG. 3.
Figure 5:
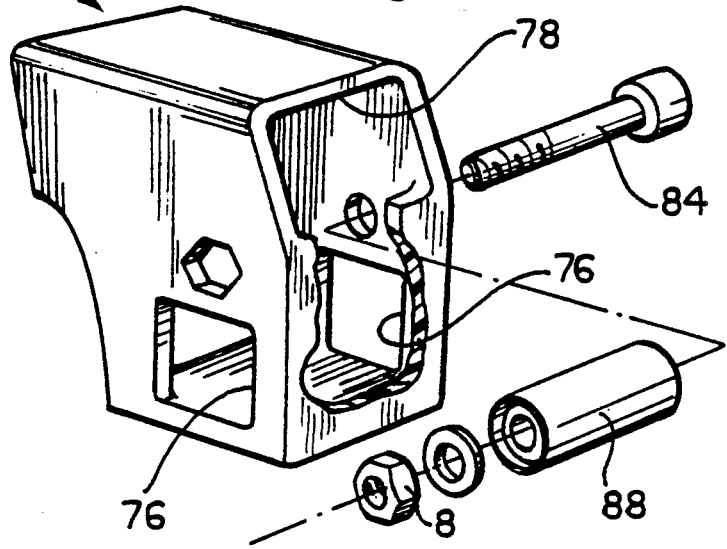
FIG. 5 is an exploded, cut-away perspective view of a detail indicated V in FIG. 4.

With reference to FIGS. 2, 3 and 4, each foot 14 is constituted essentially by a box-shaped element 22 of strong, a rigid plastics material and by a lower base 24 of relatively soft plastics or elastomeric material.

The box element 22 comprises an outer wall 26, an inner wall 28 and opposite transverse walls 30. Lower triangular edges of the transverse walls 30 are indicated 32.

The base 24 comprises a lower part 34 in the form of a thick plate and a pair of opposite transverse cheeks 36 which embrace the two edges 32.

The edges 32 and the cheeks 36 are articulated to each other by means of a longitudinal pin 38 which enables mutual pivoting of the box element 22 and the base 24. The base 24 may thus pivot relative to the box element 22 to adapt to the slope of the side part of the roof T on which it bears.

The box element 22 also includes a pair of transverse walls 40.

A longitudinal fixed pin 42 is supported in these walls 40. A first roller 44 is mounted idly in a central position on the pin 42. A pair of upwardly extending sheet metal cheeks 46 are also mounted at one of their ends so as to pivot-like levers on the pin 42. The two cheeks 46 are interconnected at intermediate points, by a second pin 48. A second roller 50 is freely rotatably mounted on this pin 48.

The ends of the two cheeks or levers 46 opposite the pin 42, are fork-shaped, so as to define respective sliding seats 52. A cross member 54, constituted by a small metal cylinder which has a diametral threaded hole 56 is rotatably and slidably mounted in these seats 52.

A screw 58 whose threaded shank 60 is engaged in the threaded hole 56 is associated with the cross member 54, which acts as a female thread. The pitch of the screw 58 is such as to make the threaded coupling irreversible. The screw 58 is mounted rotatably but not slidably in the outer wall 26. The head of the screw, indicated 62, is shaped like a handgrip to enable manual rotation of the screw 58.

As can be seen in FIGS. 2 and 3, the strap 18 passes through a lower slot 64 in the inner wall 28 and then follows an S-shaped path, round the two roller 44 and 50.

A series of three vertically spaced openings in the form of slots 66, is formed in the outer wall 26. The strap 18 is passed selectively through one of the slots 66 (the middle one in FIGS. 2 and 3). Selection of the slot 66 through which the strap 18 is passed depends on the slope to be given to the outer section 18a of the strap 18 for the hook 20 to have a good grip and for the base 24 to bear correctly on the roof T.

The tensioning of the strap 18 is achieved by clockwise rotation of the screw 58 (arrow A—FIG. 2). By means of this rotation and by virtue of the screw and female thread assembly 54–58, the two cheeks 46 are rotated in a sense so as to displace the second roller 50 transversely inwardly (arrow B, FIGS. 2 and 3). Slackening of the strap 18 is achieved by opposite movements.

The handle 62 and the shank 60 are preferably coupled by means of an anti-theft lock 68, which when locked, enables idle rotation of the handle 62 to prevent slackening of the strap 18.

As illustrated in FIGS. 2 and 3, each other section such as 18a of the strap is coupled to the hook 20 by a self-locking buckle indicated 70. This enables the hook 20 to be removed from the strap 18 and replaced by a similar hook of a different shape.

With reference to FIGS. 2 to 5, the means of clamping the cross members 12 and the side members 16 in the position of adjustment will now be described.

A recess 72 framed by the upper parts of the two transverse walls 30 is formed in the upper part of the box-shaped element 22. In this recess 72 is fitted a box-shaped insert 74 of strong rigid plastics material. This insert 74 has a lower longitudinal passage defined by two openings 76 and an upper transverse passage 78 defined by an internal chamber. The two crossing passages 76 and 78 intercommunicate due to the fact that the insert 74 is hollow.

The two transverse walls 30 have in their upper parts, openings 80 which correspond with the openings 76. The side member 16 is slidably inserted in the openings 76 and 80 and thus holds the insert 74 in its recess 72. The cross member 12, on the other hand, is slidably inserted into the transverse passage 78.

An expansible member 82 similar to an expansion plug, having a tightening screw 84, its nut 86 and a rubber sleeve 88, extends through the space between the two passages 76 and 78 and between the side member 16 and the cross member 12. As can be understood, expansion of the sleeve 88 due to tightening of the screw 84, serves to clamp the cross member 12 and the side member 16 in their required positions of adjustment, both relative to each other and relative to the insert 74 and the box element 22.

I claim:

1. A rack for a motor-vehicle roof having edge means comprising a pair of bridges each having a cross member, a pair of box-shaped feet for bearing on the roof and means for hooking and fixing each foot on to said edge means of the roof, said pair of feet having respective outer walls with an opening and upper parts with respective transverse passages, each cross member being slidably inserted in said respective transverse passages and pressure means being associated with each transverse passage for clamping the cross member in an adjusted position, wherein the hooking and fixing means of each said bridge is comprised of an inextensible strap which passes through said opening in said outer wall of each foot and which is provided, outside said outer wall, with a rigid, shaped hook which is replaceable by other similar hooks of different shapes, for hooking on said edge means of the roof and at least one of said pair of feet incorporating tensioning means for tensioning the strap, said tensioning means comprising first and second rollers with longitudinal axes, the first roller being mounted for rotation about a fixed axis, a support mounted for rotation about said fixed axis and the second roller being mounted on said support which is movable transversely with the movement of the support being controlled by an irreversible screw and female thread assembly, said strap extending along an S-shaped path around said first and second rollers.

2. A rack according to claim 1, wherein the fixed axis is constituted by a first pin supported within each foot and in turn supporting the first roller and said support comprises a pair of levers, each lever being pivotally mounted at one end thereof on the first pin and having an elongated slot formed in an opposite end thereof, a second pin connected between said pair of levers at intermediate portions thereof, said second roller being rotatably mounted on said second pin and wherein said screw and female thread assembly comprises a cross pin having a threaded hole which is rotatable and slidable in the elongated slots formed in the opposite ends of said levers and screw rotatably but not slidably mounted in the wall of the foot and having a threaded shank engaged in said threaded hole in the cross pin and an outer head which serves as a handgrip.

3. A rack for a motor-vehicle roof having edge means comprising a pair of bridges each having a cross member, a pair of box-shaped feet for bearing on the roof and means for hooking and fixing each foot on to said edge means of the roof, said pair of feet having respective outer walls with a series of vertically spaced openings in the form of slots and upper parts with respective transverse passages, each cross member being slidably inserted in said respective transverse passage and pressure means being associated with each transverse passage for clamping the cross member in an adjusted position, wherein the hooking and fixing means of each said bridge is comprised of an inextensible strap which selectively passes through said openings in said outer wall of each foot and which is provided, outside said outer wall, with a rigid, shaped hook which is replaceable by other similar hooks of different shapes, for hooking on said edge means of the roof and at least one of said pair of feet incorporating tensioning means for tensioning the strap.

4. A rack according to claim 3, wherein each foot is constituted by a box-shaped element and by a lower base for bearing on the roof with the box-shaped element mounted on said base for pivotal movement about a longitudinal axis.

5. A rack for a motor-vehicle roof having edge means comprising a pair of bridges each having a cross member, a pair of box-shaped feet for bearing on the roof and means for hooking and fixing each foot on said edge means of the roof, said pair of feet having respective outer walls with an opening and upper parts with respective transverse passages, each cross member being slidably inserted in said respective transverse passages and pressure means being associated with each transverse passage for clamping the cross member in an adjusted position, wherein the hooking and fixing means of each said bridge is comprises of an inextensible stap which passes through said opening in said outer wall of each foot and which is provided, outside said outer wall, with a rigid, shaped hook which replaceable by other similar hooks of different shapes, for hooking on said edge means of the roof and at least one of said pair of feet incorporating tensioning means for tensioning the strap, wherein said pair of feet of each bridge have respective longitudinal passages in said upper parts thereof and wherein respective feet of each pair of feet are interconnected by respective side members which extend through said respective longitudinal passages.

6. A rack according to claim 5, wherein the transverse passages and the longitudinal passages in each foot are superposed and intercommunicating and wherein said pressure means in each foot comprises a nut and bolt assembly having an expansible rubber sleeve extending between said cross member and said side member which acts as a gripping means for clamping the cross member and the side member in their respective positions of adjustment.

7. A rack according to claim 5 wherein the upper part of each foot is constituted by a box-shaped insert in which the longitudinal and transverse passages are provided and wherein each foot has respective openings in transverse walls thereof which correspond to the longitudinal passages, the side members extending through said respective openings and through the longitudinal passages.

* * * * *